Feb. 22, 1966  A. G. VALENTINE  3,237,178

CONTROL APPARATUS

Filed Nov. 1, 1963

INVENTOR.
ALASTAIR G. VALENTINE

BY *Roger W. Jensen*

ATTORNEY

United States Patent Office 3,237,178
Patented Feb. 22, 1966

3,237,178
CONTROL APPARATUS
Alastair G. Valentine, West St. Paul, Minn., assignor to Honeywell Inc., a corporation of Delaware
Filed Nov. 1, 1963, Ser. No. 320,816
6 Claims. (Cl. 340—186)

This invention is concerned generally with closed loop systems and is more specifically concerned with a rebalance type system whereby the normally used motor and rebalance potentiometer are eliminated.

As reliability becomes more and more important, it becomes necessary to remove all moving parts. Two such moving parts are the motor and the rebalance potentiometer combination in a self-rebalancing fuel gauge bridge circuit. A phase detector, reversible counter, and a digital-to-analog converter replaces the motor and rebalance potentiometer which is used in the normal rebalanceable fuel gauge bridge circuit. By using these components either a digital output can be obtained or an analog output can be obtained depending upon which output is the most useful. If it is desirable, both outputs can be obtained at the same time.

While this replacement for the motor potentiometer or rebalance network is illustrated and described as being used in conjunction with a fuel gauge unit, it is to be realized that this combination could be used to replace the motor and rebalance potentiometer in other applications where it is desired that greater reliability or a digital output be obtainable.

It is an object of this invention to provide a digital output from an analog condition sensor.

Another object is to eliminate the motor potentiometer in a closed loop system to thereby increase the reliability of the system.

Figure 1:
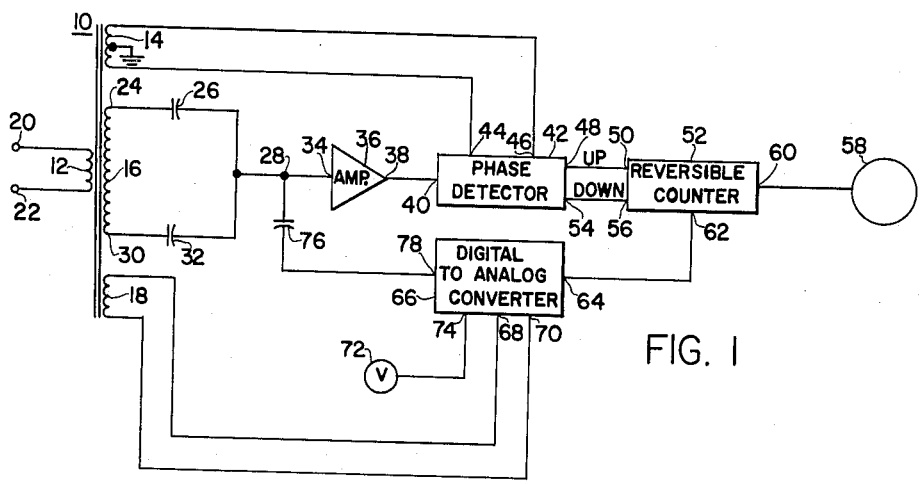
Figure 2:
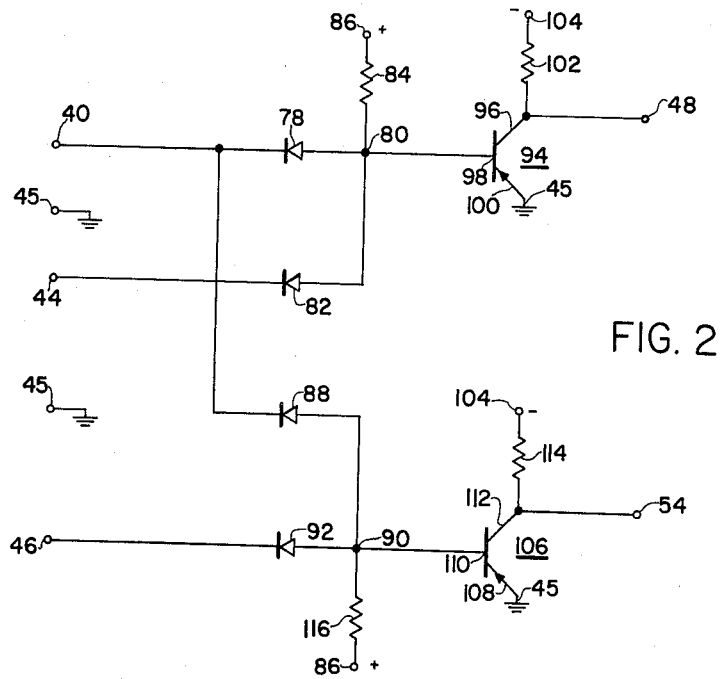

Further objects and advantages of this invention will be ascertained from a reading of the specification and appended claims in conjunction with the drawings in which:

FIGURE 1 is a block diagram of a rebalanceable bridge circuit which constitutes a preferred embodiment of the invention; and FIGURE 2 is a schematic of one phase detector which may be used for the phase detector of FIGURE 1.

In FIGURE 1 a transformer or power signal supplying means 10 having a primary winding 12 and secondary windings 14, 16 and 18 supplies alternating power to the rest of the system. The primary winding 12 has input terminals 20 and 22 which are connected to a source of alternating voltage (not shown). One end 24 of secondary winding 16 is connected to one capacitive plate of a tank unit capacitor or impedance means 26 which has its other capacitive plate connected to a summing point or junction point 28. The other end 30 of winding 16 is connected to a plate of reference capacitor 32 which has its other capacitive plate connected to junction point 28. Junction point 28 is also connetced to an input 34 of an amplifier means, summing means, or summing amplifier means 36 which has an output 38. Output 38 of amplifier 36 is connected to an input 40 of a phase detector means 42. The secondary winding 14 is connected to supply a reference signal to inputs 44 and 46 of phase detector 42. A first output 48 of phase detector 42 is connected to a first input 50 of reversible counter means, flip-flop means, or computer means 52. A second output 54 of phase detector 42 is connected to a second input 56 of reversible counter means 52. A signal at output 48 is indicative of a first phase of input signal being applied to phase detector 42 while a signal obtained at output 54 is indicative of the opposite phase signal being applied to the input 40 of phase detector 42.

It may be noted that the lead connected to output 48 is labeled UP while output 54 is labeled DOWN. These designations are for illustration purposes only and may be interpreted to mean that the output from the counter goes in an upward direction when receiving an input signal at input 50 while the numerical output decreases when receiving an input signal at input 56. An indicator 58 is connected to receive signals from an output 60 of reversible counter 52. An output 62 of reversible counter means 52 is connected to an input 64 of a digital to analog converter or voltage switch means 66. The voltage switch means 66 receives a reference or switching signal from secondary winding 18 at input terminals 68 and 70. A volt meter or indicator means 72 is connected to receive an analog output signal from an output 74 of the voltage switch 66. A capacitor 76 is connected between an output 78 of the voltage switch 66 and the junction point 28.

While many phase detector circuits may be used for phase detector 42, one specific usable circuit will be described when FIGURE 2 is discussed later in the specification. The reversible counter 52 is available commercially and can also be designed by anyone who is skilled in the art. One source of such a counter is Digital Equipment Corporation. A flip-flop circuit #1201 described in catalog No. A–705, dated March 1962, may be used in the counter. A circuit is shown in this catalog for connecting the #1201 flip-flops so as to make an up-down counter of any desired capacity. The voltage switch is also commercially available but may be designed by using a gate circuit such as a six-diode gate shown on page 445 of a McGraw-Hill publication entitled "Pulse and Digital Circuits" authored by Millman and Taub. The gating network may be used with a ladder network such as is shown in "Notes on Analog-Digital Conversion Techniques" by Susskind which was published by Technology Press and was copyrighted in 1957 by the Massachusetts Institute of Technology. One such ladder network is shown in FIGURES 5–19 on pages 5–33. The gating circuit would be utilized to switch the voltages into and out of the ladder network. This ladder network has a signal supplied from winding 18 of transformer 10 in FIGURE 1 and has a load comprising in part the capacitor 76 and the input impedance of amplifier 36. Again, many different types of voltage switches may be designed by those skilled in the art to accomplish the specific purpose desired.

The phase detector circuit of FIGURE 2 has input and output terminals corresponding to these terminals as used in the phase detector of FIGURE 1. As an example, the phase detector of FIGURE 2 has an input 40 and reference inputs 44 and 46 along with the respective ground terminals 45 in the required places. The output terminals 48 and 54 are also listed. A diode or rectifying means 78 is connected between input terminal 40 and a junction point 80. A second diode means or rectifying means 82 is connected between reference input 44 and junction point 80. A resistive means 84 is connected between a positive power supply means 86 and junction point 80. A third diode means or rectifying means 88 is connected between input 40 and a junction point 90. A fourth diode means or rectifying means 92 is connected between reference input 46 and junction point 90. The four diode means just mentioned are connected so that current flow is away from the junction points 80 and 90 or in other words the anodes of each of the diodes are directly connected to either junction point 80 or junction point 90. A transistor means or switching means 94 having a collector 96, a base 98 and an emitter 100 is shown with the base 98 connected to junction point 80. The transistor 94 has a PNP polarity.

The emitter 100 is connected to ground 45. A resistor 102 is connected between a negative power terminal 104 and collector 96 of transistor 94. The output terminal 48 is also connected to collector 96. A second PNP transistor means 106 has an emitter 108, a base 110 and a collector 112. The emitter 108 is connected to ground 45 while the base 110 is connected to junction point 90. A resistive means 114 is connected between the negative power supply 104 and collector 112. Collector 112 is also connected to output terminal 54. A resistive means 116 is connected between the positive power supply terminal 86 and junction point 90.

OPERATION

In describing the operation of FIGURE 2 it will be assumed that the signals applied between terminals 44 and 46 and ground 45 are of the same frequency as the signal applied between ground 45 and input 40. Normally the transistors 94 and 106 are conducting in spite of the fact that the bias voltage applied to resistors 84 and 116 is positive. Normally current will flow from the positive supply through the resistor and one of the two diodes connected to the resistor to a negative voltage being supplied either by the input signal or the reference signal. The only time that transistor 94 or 106 becomes nonconductive or turns to the OFF state is when both the input and the reference signal being applied to the appropriate base goes in a positive direction with respect to ground such that the base becomes positive with respect to ground 45. As an example it may be assumed that the signal applied to reference terminal 44 is positive with respect to ground 45 at the same time that input 40 is positive with respect to ground 45. Since both of these terminals are positive with respect to ground, connection through diodes 78 and 82 is prevented and therefore junction point 80 rises to a potential which is approximately ½ volt higher than the lowest of the two voltages applied at inputs 40 or 44 or the power supply voltage applied to terminal 86. This action turns transistor 94 OFF. However, even though inut 40 is positive with respect to ground 45 so as to prevent condition from power supply 86 through diode 88, the reference input 46 will be negative with respect to ground 45 and allow conduction from power supply 86 through diode 92 to place base 110 negative with respect to ground 45 and thereby continue conduction through transistor 106. While the two positive power terminals and the two negative power terminals have been given the same number respectively, it is to be understood that if it is desirable the two positive terminals may have different supply voltages connected thereto. It might also be desirable to supply different voltages to the collectors of the two transistors from the negative power supply terminals. In view of the above description it can be determined that if the input terminal 40 is positive with respect to ground 45 at the same time that input 46 is positive with respect to ground 45 that transistor 106 will stop conducting and 94 will continue conducting so as to provide a different output signal from what was supplied in the first described situation when terminals 40 and 44 were simultaneously positive with respect to ground.

The bridge circuit of FIGURE 1 is shown very simply as comprising a secondary winding 16 along with a tank unit 26 and a reference capacitor 32. The reference capacitor 32 has the same capacitance as the empty tank capacitance of tank unit 26. A more detailed recitation as to the operation of this circuit may be obtained from the Franzel et al. Patent 3,037,385 which is assigned to the same assignee as the present invention. As mentioned in connection with other items previously, the present invention is designed to replace the motor and rebalance potentiometer of closed loop systems such as is shown in the above-mentioned Franzel et al. patent. When fluid appears between the plates of tank unit 26, the capacitance of the tank unit is increased and a signal appears at the junction point 28 indicative of the increase in capacitance of capacitor 26 over the capacitance of capacitor 32. This signal is amplified by amplifier 36 and applied to the phase detector 42. The phase detector will supply an output at one of the output terminals which will be assumed to be output 48 for the purposes of this discussion. The output signals from phase detector 42 are mutually exclusive or in other words a signal will appear at output 48 or at output 54 but not at both outputs at the same time. The counter 52 will receive the signal indicating that there is more fuel in the tank than there was previously and will increase the numerical value of the output signal, as long as UP pulses are applied to the counter. The digital to analog converter 66 will convert this increased digital output signal to an increased analog signal of a phase opposite that supplied to lead 34 from the tank unit 26 to counteract or minimize the effect of the bridge circuit signal. At some point this signal being applied to amplifier 36 through capacitor 76 increases enough so that the phase detector no longer has an output at terminal or output 48. At this time the counter 52 will no longer have any input signals and therefore will provide a non-changing output to indicator 58 and this output will be indicative of the mass or quantity of fluid being measured. As is realized by those skilled in the art, the volume or mass of fluid in the container can be obtained by making various changes in the bridge circuit and these changes will not have any effect upon the operation of the subject matter of this invention. As previously mentioned, if the indicator is an analog type indicator which as a volt meter, the fuel gauge indication may be obtained from the digital to analog converter 66 instead of from the output of the reversible counter 52.

It has been mentioned before that many different circuits can be used to supply the interior of the boxes designated as phase detector, reversible counter, and digital to analog converter. In summary, a description of the purpose of each of these units will provide a useful criterion in selecting such circuits in the event that the ones previously mentioned are not available.

The phase detector 42 determines the direction that the counter must be incremented to obtain a balance. The output from this circuit is used to gate clock pulses into the increment or decrement command lines in the counter.

The purpose of the counter is three-fold: (1) to store the accumulation of "UP" and "DOWN" commands from the phase detector, (2) to provide a parallel output to a peripheral device such as an indicator, and (3) to provide both the true and the complementary outputs to the voltage switch. The counter must have the property of unit incrementation both negative and positive. As previously mentioned, the counter may be easily designed by a number of methods such as the suggested one of purchasing the building block counting units from Digital Equipment Corporation.

The purpose of the voltage switch or digital to analog converter is to alter the rebalance voltage in response to the counter output. This circuit in the preferred embodiment includes a resistive ladder network which will provide a constant output resistance to minimize errors in the bridge circuit. By using the resistive ladder network, identical stages may be added in cascade to increase the range of the digital output. An increased range of digital output may be obtained without altering the output resistance and thereby upsetting the accuracy of the bridge network. In this scheme the magnitude of the switched voltage is the same for every stage. Thus the voltage scaling is accomplished by the ladder network rather than by the switches themselves.

While a preferred embodiment has been described, it is to be realized that the invention is broadly applicable to any type of closed loop rebalance system and that I wish to be limited only by the appended claims.

I claim:

1. Digital apparatus in a closed loop indicating system comprising, in combination:
rebalance bridge circuit means including condition sensitive means, input means and output means;
power signal supplying means connected to said input means of said bridge circuit means for supplying a power signal thereto;
amplifier means including input and output means;
first means connected to said output means of said bridge circuit means and to said input means of said amplifier means for supplying a signal thereto which is representative of a condition;
phase detector means including input means and first and second output means, said phase detector means supplying an output at said first output means when an input signal of a first phase is applied to said input means of said phase detector means and supplying an output signal at said second output means when an input signal of a second phase is applied to said input means of said phase detector means;
second means connecting said output means of said amplifier means to said input means of said phase detector means;
reversible counter means including first input means, second input means, and output means, said reversible counter means providing a digital output at said output means of said counter means indicative of the number of input pulses applied to said first input means of said counter means less the number of pulses applied to said second input means of said counter means;
third means connecting said first and second output means of said phase detector means to said first and second input means respectively of said reversible counter means;
indicator means connected to said reversible counter means, said indicator means providing an output indicative of the condition being sensed; and
voltage switch means connected between said reversible counter means and said rebalance bridge circuit means for converting said digital output to an analog signal and for applying the analog signal to said amplifier means to minimize the effect of the signal from said rebalance bridge circuit means.

2. Digital apparatus in a closed loop indicating system comprising, in combination:
rebalance bridge circuit means including condition sensitive means and output means;
summing means including input and output means;
first means connected to said output means of said bridge circuit means and to said input means of said summing means for supplying a signal thereto which is representative of a condition;
phase detector means including input means and first and second output means, said phase detector means supplying an output at said first output means when an input signal of a first phase is applied to said input means of said phase detector means and supplying an output signal at said second output means when an input signal of a second phase is applied to said input means of said phase detector means;
second means connecting said output means of said summing means to said input means of said phase detector means;
counter means including first and second input and output means, said counter means providing a digital output at said output means of said counter means indicative of the number of input pulses applied to said first input means of said counter means less the number of pulses applied to said second input means of said counter means;
third means connecting said first and second output means of said phase detector means to said first and second input means respectively of said counter means;
indicator means connected to said counter means, said indicator means providing an output indicative of the condition being sensed; and
voltage switch means connected between said counter means and said rebalance bridge circuit means for converting said digital output to an analog signal and for applying the analog signal to said summing means to counteract the effect of the signal from said rebalance bridge circuit means.

3. Digital apparatus in a closed loop system comprising, in combination:
circuit means including condition sensitive means and output means for supplying an output signal indicative of a condition;
phase detector means including input means and first and second output means, said phase detector means supplying an output at said first output means when an input signal of a first phase is applied to said input means of said phase detector means and supplying an output signal at said second output means when an input signal of a second phase is applied to said input means of said phase detector means;
second means connecting said output means of said circuit means to said input means of said phase detector means;
counter means including first and second input and output means, said counter means providing a digital output at said output means of said counter means indicative of the number of input pulses applied to said first input means of said counter means less the number of pulses applied to said second input means of said counter means;
third means connecting said first and second output means of said phase detector means to said first and second input means respectively of said counter means; and
voltage switch means connected between said counter means and said circuit means for converting said digital output to an analog signal and for applying the analog signal to said circuit means to oppose the effect of the signal from said circuit means.

4. Solid state rebalance apparatus comprising, in combination:
bridge circuit means for providing an output first signal of a first phase and of an amplitude indicative of a condition being sensed;
summing amplifier means connected to said bridge circuit means for receiving the first signal therefrom, said summing amplifier means providing an output second signal indicative of the sum of all signals supplied said summing amplifier means;
phase detector means connected to said summing amplifier means for receiving said output second signal therefrom, said phase detector means including first and second output means, and said phase detector means providing mutually exclusive output third and fourth pulse signals at said first and second output means respectively, the mutually exclusive third and fourth signals signifying the second signal is of one phase or the opposite phase respectively;
counter means connected to said phase detector means for receiving said third and fourth pulse signals therefrom, said counter means including output means, and said counter means providing a digital output indicative of the number of third pulse signals received less the number of fourth pulse signals; and
digital to analog converter means connected to said counter means and to said summing amplifier means, said converter means providing an output fifth signal of a phase opposite said first phase and of an amplitude indicative of the numerical value of said digital output, and said first signal and said fifth signal combining toward providing a minimum resultant signal through said summing amplifier means.

5. Solid state rebalance apparatus comprising, in combination:
   circuit means providing an output first signal of a first phase and of an amplitude indicative of a condition being sensed;
   summing means connected to said circuit means for receiving the first signal therefrom, said summing means providing an output second signal indicative of the sum of all signals supplied said summing means;
   phase detector means connected to said summing means for receiving said output second signal therefrom, said phase detector means including first and second output means, and said phase detector means providing mutually exclusive output third and fourth pulse signals at said first and second output means respectively, the mutually exclusive third and fourth signals signifying the second signal is of one phase or the opposite phase respectively;
   counter means connected to said phase detector means for receiving said third and fourth pulse signals therefrom, said counter means including output means, and said counter means providing a digital output indicative of the quantity of third pulse signals received less the quantity of fourth pulse signals; and
   digital to analog converter means connected to said counter means and to said summing means, said converter means providing an output fifth signal of a phase opposite said first phase and of an amplitude indicative of the numerical value of said digital output, and said first signal and said fifth signal combining to minimize said second signal from said summing means.

6. Solid state rebalance apparatus comprising, in combination:
   bridge circuit means providing an output first signal of a first phase and of an amplitude indicative of a condition being sensed;
   summing means connected to said bridge circuit means for receiving the first signal therefrom, said summing means providing an output second signal indicative of the sum of all signals supplied said summing means;
   detector means connected to said summing means for receiving said output second signal therefrom, said detector means including first and second output means, and said detector means providing output third and fourth pulse signals at said first and second output means respectively, the third and fourth signals signifying the second signal is of one phase or the opposite phase respectively;
   counter means connected to said detector means for receiving said third and fourth pulse signals therefrom, said counter means including output means, and said counter means providing a digital output indicative of the quantity of third pulse signals received less the quantity of fourth pulse signals; and,
   voltage switch means connected to said counter means and to said summing means, said voltage switch means providing an output fifth signal of a phase opposite said first phase and of an amplitude indicative of the numerical value of said digital output, and said first signal and said fifth signal combining toward providing a minimum resultant signal through said summing means.

No references cited.

NEIL C. READ, *Primary Examiner.*